United States Patent
Barwicz et al.

(10) Patent No.: US 10,393,962 B2
(45) Date of Patent: Aug. 27, 2019

(54) OPTIMIZED STAND-OFFS AND MECHANICAL STOPS FOR PRECISE THREE DIMENSIONAL SELF-ALIGNMENT

(71) Applicant: INTERNATIONAL BUSINESS MACHINES CORPORATION, Armonk, NY (US)

(72) Inventors: Tymon Barwicz, Yorktown Heights, NY (US); Yves Martin, Ossining, NY (US); Jae-Woong Nah, Closter, NJ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/827,306

(22) Filed: Nov. 30, 2017

(65) Prior Publication Data
US 2019/0162902 A1    May 30, 2019

(51) Int. Cl.
*G02B 6/13*    (2006.01)
*G02B 6/42*    (2006.01)

(52) U.S. Cl.
CPC ............. *G02B 6/13* (2013.01); *G02B 6/4238* (2013.01)

(58) Field of Classification Search
CPC ................................ G02B 6/13; G02B 6/4238
USPC .......................................................... 385/14
See application file for complete search history.

(56) References Cited

U.S. PATENT DOCUMENTS

| 6,888,989 | B1 | 5/2005 | Zhou et al. |
| 8,501,536 | B2 | 8/2013 | Mooney et al. |
| 9,466,590 | B1 | 10/2016 | Barwicz et al. |
| 9,543,736 | B1 | 1/2017 | Barwicz et al. |
| 9,606,308 | B2 | 3/2017 | Barwicz et al. |
| 2002/0110328 | A1* | 8/2002 | Bischel ............... G02B 6/4201 385/49 |

(Continued)

FOREIGN PATENT DOCUMENTS

WO    2017027458    2/2017

OTHER PUBLICATIONS

Qin, Yiheng, et al., "Low-Temperature Bonding for Silicon-Based Micro-Optical Systems", Photonics 2015, 2, 1164-1201.

*Primary Examiner* — Jerry M Blevins
(74) *Attorney, Agent, or Firm* — F. Chau & Associates, LLC

(57) ABSTRACT

A method for assembling a semiconductor device includes: receiving a first chip including a plurality of first bonding pads, a first standoff and a second standoff, wherein a first solder is deposited on each of the first bonding pads; depositing a second solder on each of the first and second standoffs; arranging a second chip over the first chip, wherein the second chip includes a plurality of second bonding pads, and at least one of the second bonding pads has a corresponding first bonding pad; heating the second chip over a melting point of the second solder to melt the second solder, and placing the second chip on the first chip to touch and solidify the second solder on each of the first and second standoffs; performing a reflow process to melt the first solder on each of the first bonding pads so that at least one of the first solders touches a corresponding second bonding pad; and waiting a predetermined period of time to allow the second chip to move until a side edge of the second chip touches a waveguide of the first chip.

19 Claims, 13 Drawing Sheets

(56) References Cited

U.S. PATENT DOCUMENTS

| | | |
|---|---|---|
| 2006/0239612 A1 | 10/2006 | De Dobbelaere et al. |
| 2007/0122081 A1* | 5/2007 | Doerr .................... G02B 6/125 385/46 |
| 2016/0252688 A1* | 9/2016 | Barwicz ............... G02B 6/4238 385/14 |
| 2017/0003463 A1 | 1/2017 | Nadeau et al. |

* cited by examiner

OPTIMIZED STAND-OFFS AND MECHANICAL STOPS FOR PRECISE THREE DIMENSIONAL SELF-ALIGNMENT

BACKGROUND

The present invention is related to the assembly of microelectronic, photonic, and optoelectronic devices.

Flip-chip assembly of an edge-emitting laser chip (e.g., an indium phosphide (InP) laser chip) on another photonic chip (e.g., a silicon (Si) photonic chip), requires an edge of the laser chip to touch waveguides of the Si photonic ship. Such optical alignment between the laser chip and the Si photonic chip requires accuracy below 1 µm in three dimensions. This alignment is achieved via the surface tension of solder between the laser chip and the other photonic chip when the solder is melted during assembly.

If solder volume is not large enough, it is difficult to get good laser chip movement for self-alignment into a final position. This is so, because the friction force of the chip's surface and a standoff is bigger than a self-alignment force using solder surface tension. If there is too much solder to get a high force of X and Y-axis self-alignment, Z-axis alignment is not possible because the solder joint lifts the chip above the standoff. Accordingly, there is a need to minimize the friction for three-dimensional alignment.

In addition, when placing several laser chips on a single Si photonics substrate, the already placed chips can adversely move while a new chip is placed. Accordingly, there is a need to hold the already placed chips, while the next chips are placed. Also, all placed laser chips are required not to be moved during handling and belt reflow processes until the self-alignment is finished.

SUMMARY

According to an exemplary embodiment of the present invention, there is provided a method for assembling a semiconductor device, the method including: receiving a first chip including a plurality of first bonding pads, a first standoff and a second standoff, wherein a first solder is deposited on each of the first bonding pads; depositing a second solder on each of the first and second standoffs; arranging a second chip over the first chip, wherein the second chip includes a plurality of second bonding pads, and at least one of the second bonding pads has a corresponding first bonding pad; heating the second chip over a melting point of the second solder to melt the second solder, and placing the second chip on the first chip to touch and solidify the second solder on each of the first and second standoffs; performing a reflow process to melt the first solder on each of the first bonding pads so that at least one of the first solders touches a corresponding second bonding pad; and waiting a predetermined period of time to allow the second chip to move until a side edge of the second chip touches a waveguide of the first chip.

According to an exemplary embodiment of the present invention, there is provided a method for assembling a semiconductor device, the method including: receiving a first chip including a plurality of standoffs, a plurality of waveguides and a plurality of first bonding pads, wherein a first solder is deposited on at least one of the first bonding pads, and a second solder is deposited on at least one of the standoffs; heating a second chip over a first temperature, wherein the first temperature is high enough to melt the second solder, and placing the second chip on the standoffs to touch the melted second solder; and performing a reflow soldering process to cause the first solder to touch a corresponding second bonding pad of the second chip and a side of the second chip to touch at least one of the waveguides, wherein the first chip is heated to a second temperature high enough to melt the first solder during the reflow soldering process.

According to an exemplary embodiment of the present invention, there is provided a semiconductor device that includes a first chip comprising a plurality of first bonding pads, a plurality of standoffs, and a plurality of waveguides, wherein a first solder is disposed on each of the first bonding pads, a second solder is disposed on at least one of the standoffs, and a melting point of the second solder is lower than a melting point of the first solder; and a second chip comprising a plurality of second bonding pads arranged on a first side of the second chip, wherein the first side of the second chip is disposed directly on the second solder, at least one of the second bonding pads is connected to a corresponding first bonding pad via the first solder, and a second side of the second chip contacts at least one of the waveguides.

BRIEF DESCRIPTION OF THE DRAWINGS

In the drawings, like reference numerals may refer to like elements.

DETAILED DESCRIPTION

In accordance with an exemplary embodiment of the present invention, there is provided a flip-chip assembly process in which a low melting temperature solder is deposited on the top of standoffs of an Si photonics chip.

Figure 1:
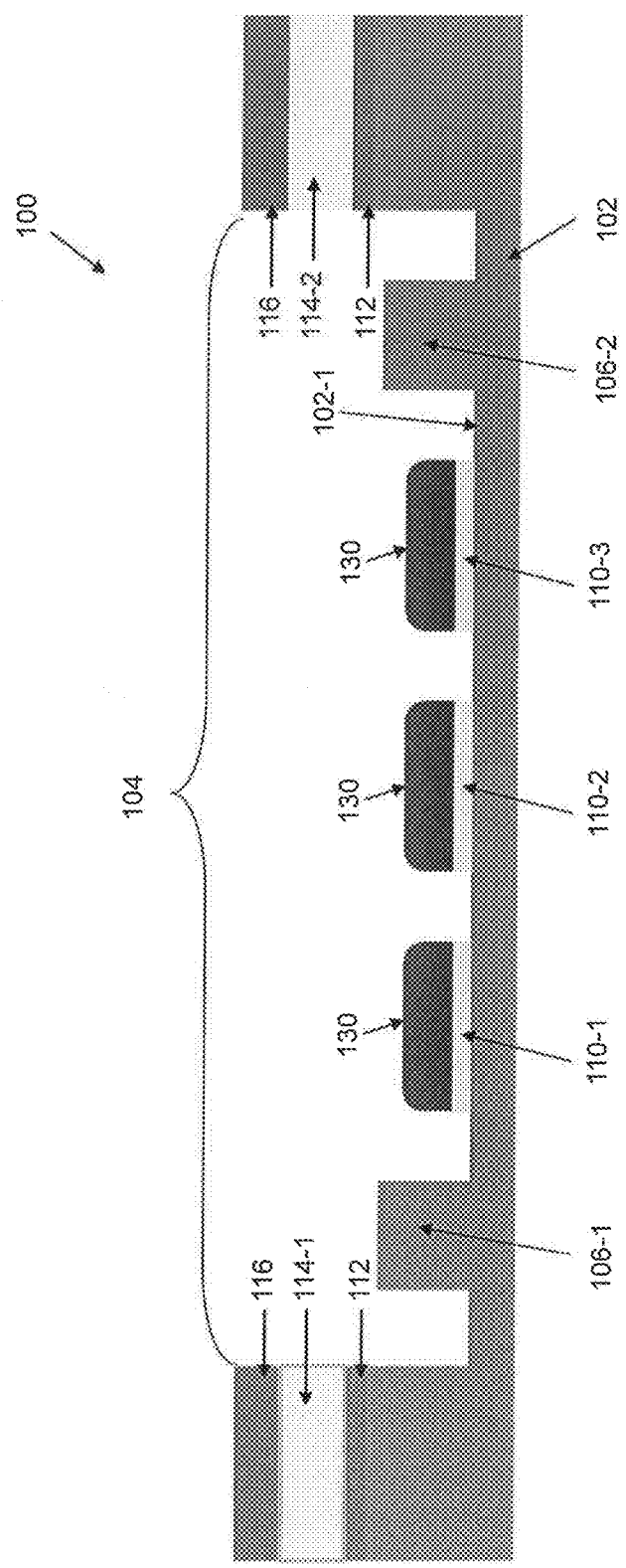
FIG. 1 is a cross-sectional view of a Si photonics substrate.

FIG. 1 is a cross-sectional view of an Si photonics substrate. More specifically, FIG. 1 is a cross-sectional side view of a photonics chip 100 (e.g., a nanophotonics chip).

Referring FIG. 1, the photonics chip 100 comprises a substrate 102 (e.g., a silicon substrate) having a recessed surface 102-1 within an etched cavity region 104 of the photonics chip 100. A plurality of vertical standoff structures 106-1 and 106-2 are disposed on the recessed surface 102-1 of the cavity region 104. The vertical standoff structures 106-1 and 106-2 are formed using standard lithographic and etching techniques during formation of the recessed cavity region 104.

The vertical standoff structures 106-1 and 106-2 are configured to make contact with a surface of a laser chip (200, in FIG. 3) during assembly and, therefore, serve as vertical standoffs (or posts) for Z-direction alignment during flip-chip assembly of the laser chip 200 and photonics chip 100.

As further shown in FIG. 1, a first array of bonding pads 110 is formed on the recessed surface 102-1 of the substrate 102. The first array of bonding pads 110 comprises a plurality of metallic bonding pads (such as metallic bonding pads 110-1, 110-2 and 110-3). In one embodiment of the invention, the first array of bonding pads 110 is formed using standard under bump metallization (UBM) techniques, wherein the metallic bonding pads can be formed of a combination of Ti, Ni, Cu, Pd, Pt, or Au (e.g., 0.03 µm Ti/1 µm Cu/0.2 µm Ni/0.1 µm Au, 0.03 µm Ti/0.2 µm Pd/0.1 µm Au).

The photonics chip 100 further comprises a first insulating layer 112 (e.g., a silicon oxide layer), a waveguides 114-1 and 114-2, and a second insulating layer 116 (e.g., a polyimide layer) formed on an upper surface of the substrate 102 outside of the recessed cavity region 104.

It is to be understood that certain features may be exaggerated in the drawings for clarity. Thus, for example, even though the thickness of the waveguides (e.g., about 0.25 µm) is smaller than the thickness of the two insulating layers (e.g., about 2 to 3 µm), the waveguides are shown to be thicker.

As further shown in FIG. 1, to enable flip-chip bonding of the laser chip 200 to the photonics chip 100, first solder 130 is formed on the metallic bonding pads (e.g., bonding pads 110-1, 110-2 and 110-3) of the first array of bonding pads 110. In one embodiment of the invention, first solder 130 is deposited on the bonding pads 110 using, e.g., an electroplating process. In one embodiment of the invention, the first solder 130 is formed of Sn and Ag, e.g., Sn and 0.6 wt % Ag. In one embodiment of the invention, the first solder 130 may be regular Pb-free solder. For example, first the solder 130 may include Sn, SnAg, SnCu, SnAgCu, etc. A melting point of the first solder 130 is over 200° C., for example.

Figure 2:
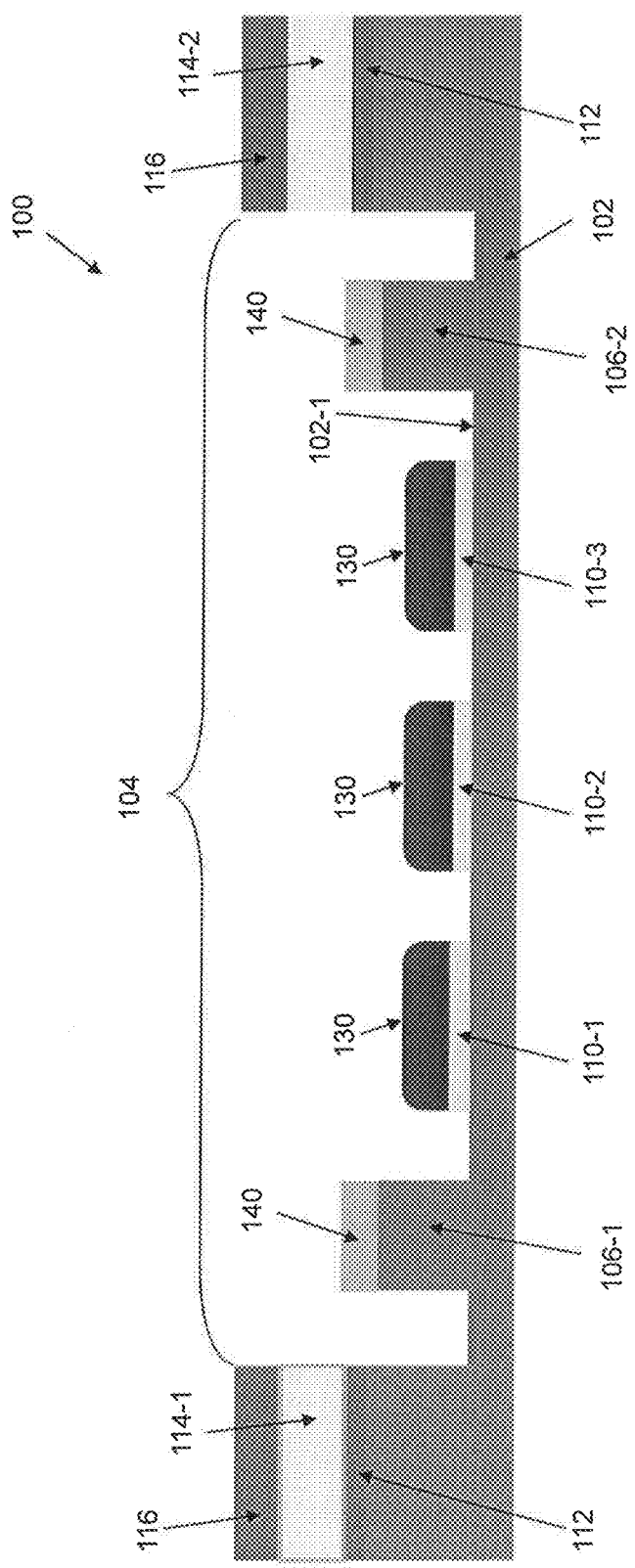
FIGS. 2-8 are cross-sectional views illustrating a method for assembling a semiconductor device according to an exemplary embodiment of the present invention.

FIG. 2 is a cross-sectional view of the photonics chip 100. In the method for assembling a semiconductor device according to an exemplary embodiment of the present invention, a second solder 140 is deposited on the standoffs 106-1 and 106-2. The second solder 140 has a lower melting point than the first solder 130. For example, the second solder 140 may include Indium with a melting point of 158° C., In—Sn with a melting point of 120° C., Sn—Bi with a melting point of 139° C., In—Bi with a melting point of 72° C., etc. The second solder 140 may be deposited using a variety of methods such as evaporation, sputtering, etc.

Figure 3:
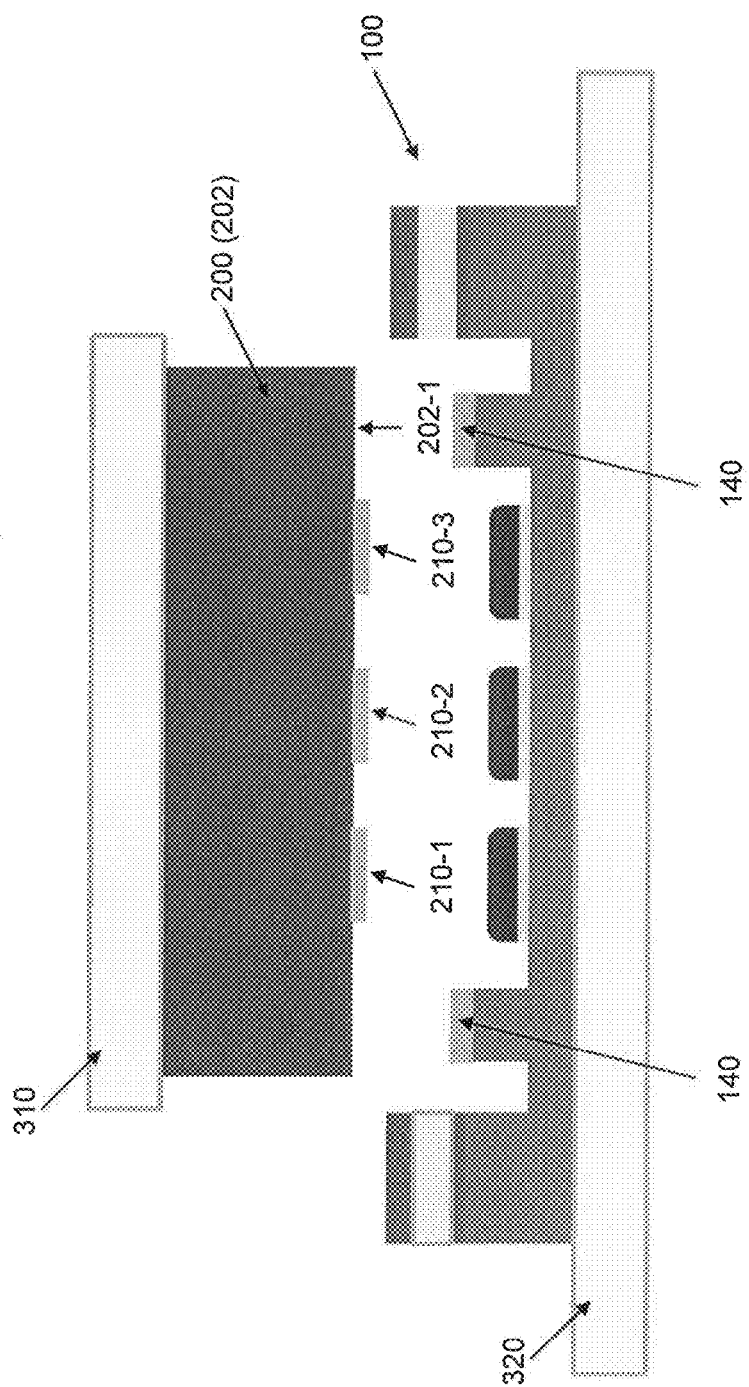

FIG. 3 shows the laser chip 200 positioned over the photonics chip 100. The laser chip 200 includes a substrate 202 (e.g., a silicon substrate) and a second array of bonding pads 210 formed on a bottom surface 202-1 of the substrate 202 of the laser chip 200. The second array of bonding pads 210 comprise a plurality of metallic bonding pads (such as metallic bonding pads 210-1, 210-2 and 210-3), which are matched to corresponding ones of the metallic bonding pads of the first array of bonding pads 110 formed on the recessed surface 102-1 of the substrate 102 of the photonics chip 100. In one embodiment of the invention, the second array of bonding pads 210 are formed using standard UBM techniques, wherein the metallic bonding pads can be formed of a combination of Ti, Ni, Cu, Pd, Pt, or Au (e.g., 0.03 µm Ti/1 µm Cu/0.2 µm Ni/0.1 µm Au, 0.03 µm Ti/0.2 µm Pd/0.1 µm Au).

Figure 4:
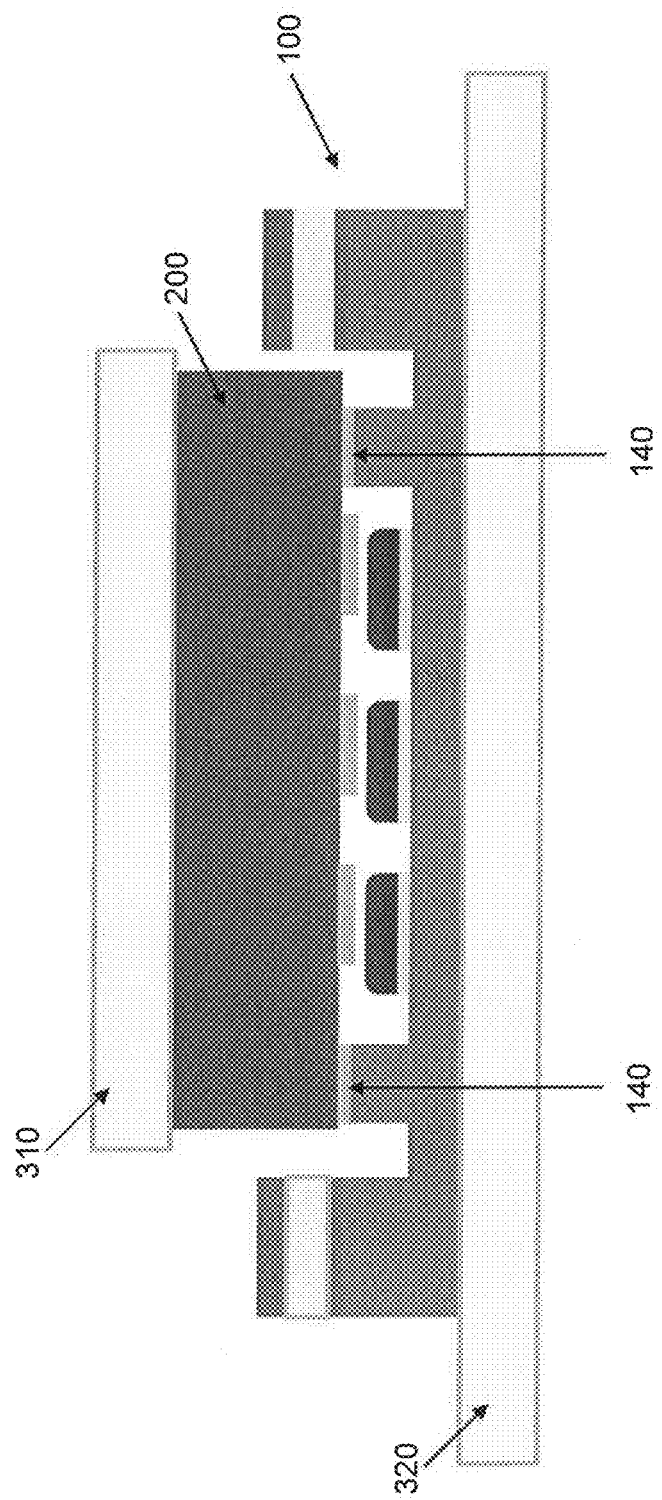

The laser chip 200 is positioned over the photonics chip 100 by a pick and place tool head 310, while the photonics chip 100 is held in place by a pick and place bottom plate 320. In the method for assembling a semiconductor device according to an exemplary embodiment of the present invention, the laser chip 200 is heated over the melting temperature of the second solder 140 on the standoffs 106-1 and 106-2, and then, as shown in FIG. 4, is placed on the photonics chip 100.

For example, when the second solder 140 is indium solder with a melting point of 158° C. and the first solder 130 is tin solder with a melting point of 230° C., the tool head 310 may be heated to 180° C. The tool head 310 may then pick up the laser chip 200 and place the laser chip 200 on the melted indium solder surface. The bottom plate 320 may have a temperature of about 30° C., during this process.

Figure 5:
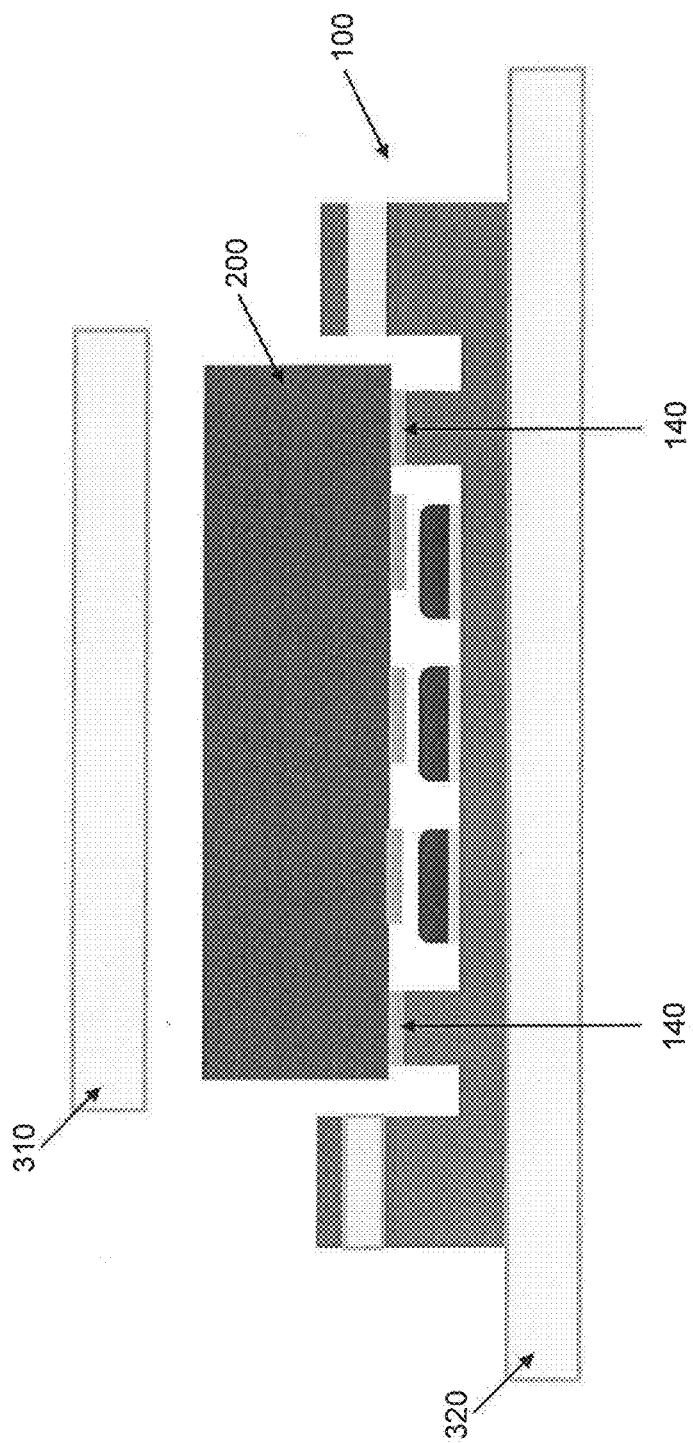
Figure 6:
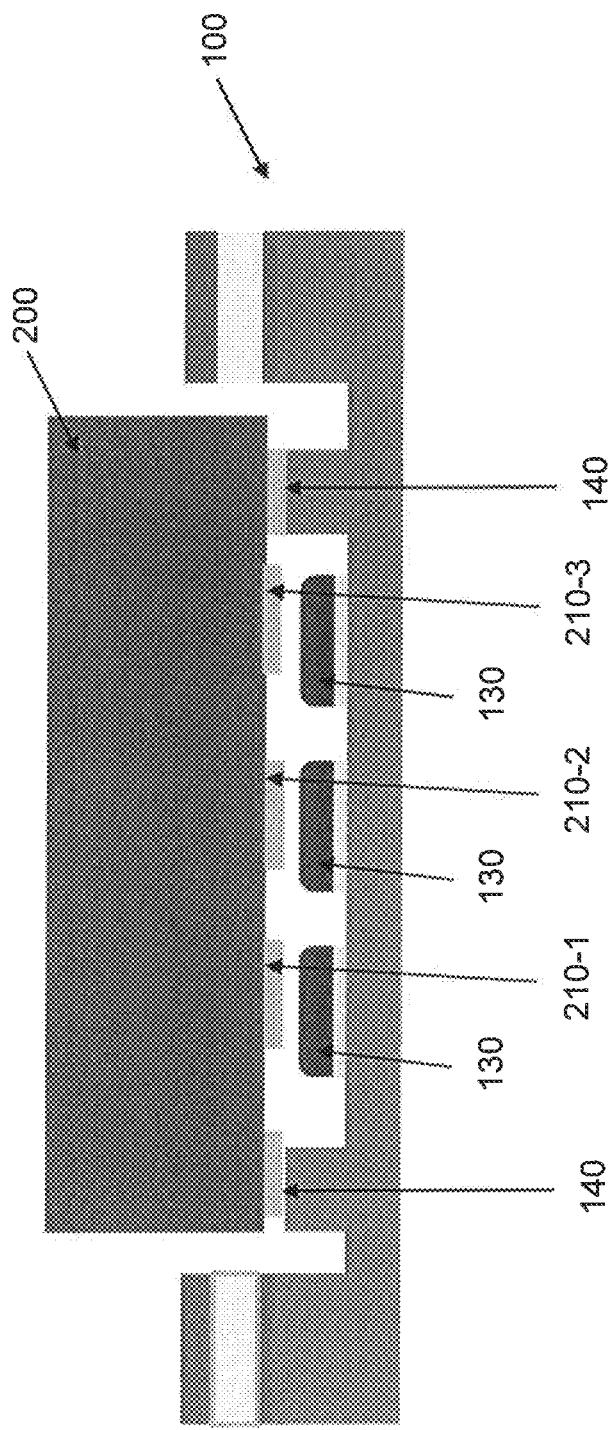
Figure 7:
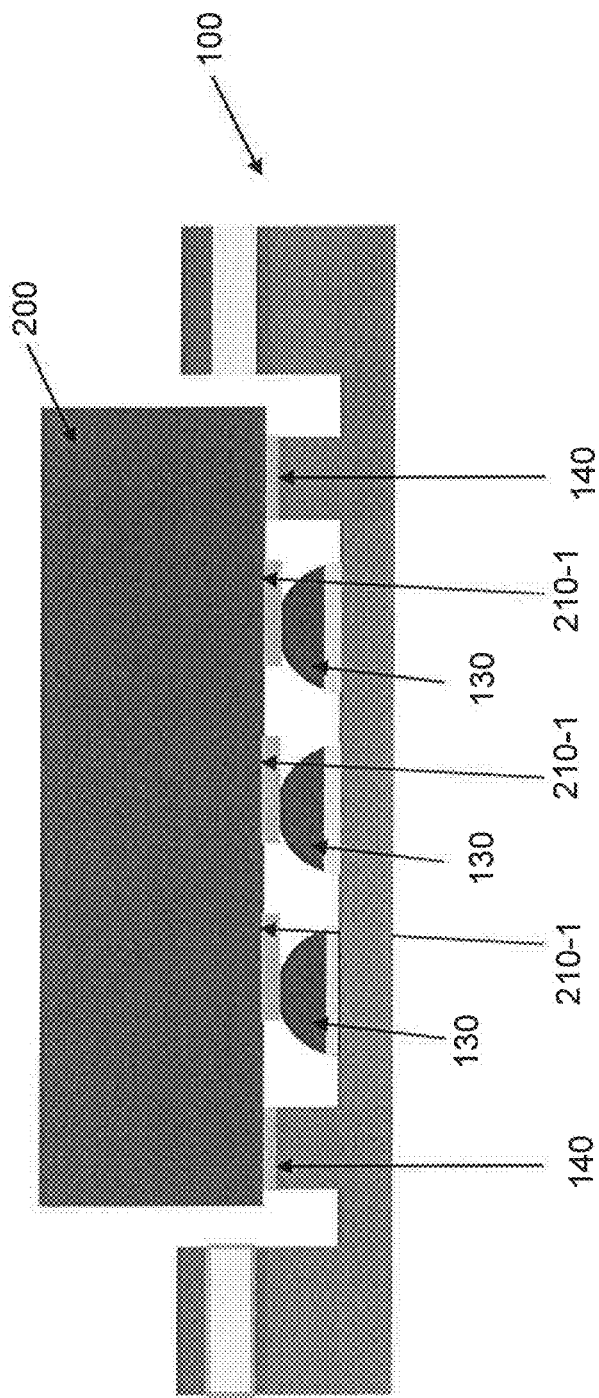

As shown in FIG. 5, after a period of time, the tool head 310 is separated from the laser chip 200 and the indium solder, i.e., the second solder 140 is solidified and holds the laser chip 200 in place. In this case, the second solder 140 functions as a tacking agent. FIGS. 6 and 7 show a reflow process in which the first solder 130 on each of the first bonding pads 110-1, 110-2 and 110-3 is melted so that each of the first solders 130 touches a corresponding bonding pad 210-1, 210-2 and 210-3 of the laser chip 200.

In particular, FIG. 6 shows an initial stage of the reflow process where the temperature starts to be increased over the melting point of the tin solder, i.e., the first solder 130. When the first solder 130 begins to melt during the initial phase of the solder reflow process, the flat solders 130 become ball-shaped, which causes the solders 130 to make contact with corresponding ones of the bonding pads (e.g., bonding pads 210-1, 210-2 and 210-3) on the bottom surface 202-1 of the laser chip 200. In reference to FIG. 7, once the molten solders 130 touch the bonding pads 210 of the laser chip 200, the molten solders 130 start wetting and spreading on the bonding pads 210. In other words, the tin solders ball up and touch the Au pads on the laser chip 200.

Figure 8:
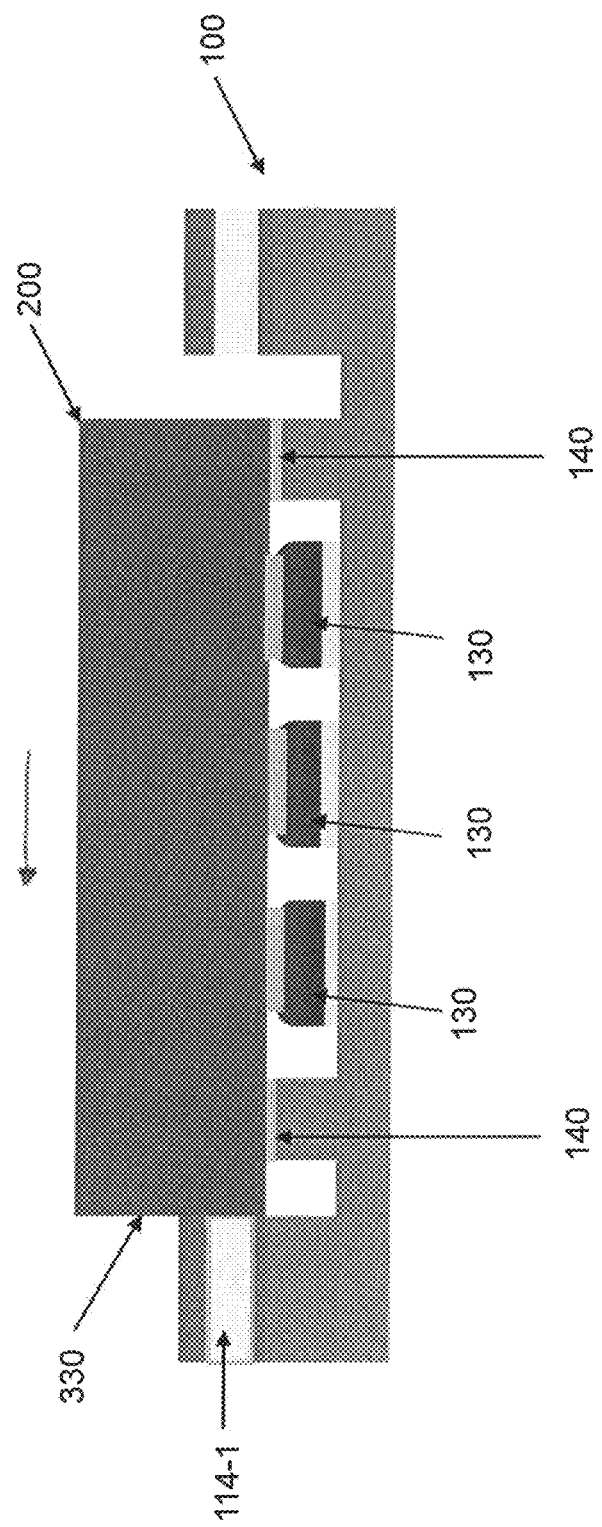

During reflow, the surface tension forces of the melted solder 130 on the bonding pads 210 of the laser chip 200 are effective to induce movement of the laser chip 200 in the X and Y directions to minimize the surface energy of the molten solder 130. In particular, as shown in FIG. 8, the laser chip 200 is moved in the X direction until the edge 330 of the laser chip 200 is butted against the waveguide 114-1.

During the self-alignment process by the first solder, e.g., tin solder 130, since the second solder, e.g., indium solder 140, is molten, there is very low friction between the bottom surface 202-1 of the laser chip 200 and the top of the standoffs 106-1 and 106-2. This is so, because indium is solidified later than tin. Furthermore, the indium, i.e., the second solder 140, is initially deposited as a very thin layer having a thickness from about 0.01 micron to 1 micron. Therefore, there is no electrical shorting even if the indium flows off the standoffs 106-1 and 106-2. In addition, the thin layer of indium does not affect Z-direction alignment.

In accordance with an exemplary embodiment of the present invention, there is provided a flip-chip assembly process in which a low melting temperature solder is deposited on the top and/or sidewall(s) of standoffs and mechanical stops of an Si photonics chip.

Figure 9:
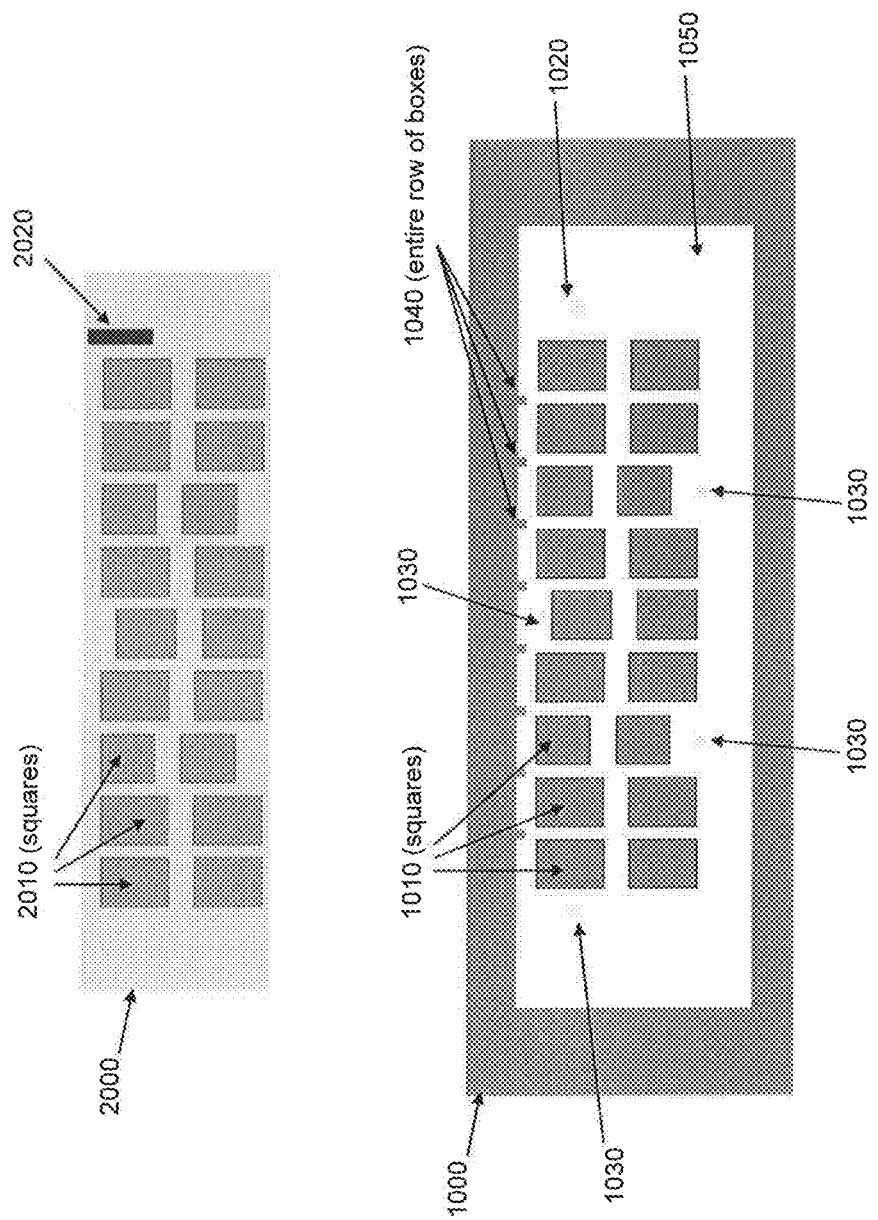
FIG. 9 illustrates an arrangement of a laser chip and Si-photonic chip.

FIG. 9 illustrates an arrangement of a laser chip and an Si-photonics chip from a top view. In particular, FIG. 9 shows a laser chip 2000 and an Si-photonics chip 1000. The laser chip 2000 includes a plurality of bonding pads 2010 and a mechanical stop 2020. The Si-photonics chip 1000 includes a plurality of bonding pads 1010, a standoff and mechanical stop structure 1020, a plurality of standoffs 1030, a plurality of waveguides 1040 and a cavity 1050.

The bonding pads 1010 correspond to the bonding pads 110-1, 110-2 and 110-3, described above. The standoffs 1030 correspond to the standoffs 106-1 and 106-2, described above. The waveguides 1040 correspond to the waveguides 114-1 and 114-2 described above. The cavity 1050 corresponds to the cavity 104 described above. The bonding pads 2010 correspond to the bonding pads 210-1, 210-2 and 210-3, described above. The standoff and mechanical stop structure 1020, is a vertical structure like the above-described standoffs 106-1 and 106-2 and serves as a mechanical stop for the X-direction alignment during flip-chip assembly of the laser chip 2000 and the photonic chip 1000. The mechanical stop 2020 serves as a mechanical stop against which the vertical standoff structure 1020 makes contact for X-direction alignment during flip-chip assembly of the laser chip 2000 and the photonic chip 1000.

Figure 10:
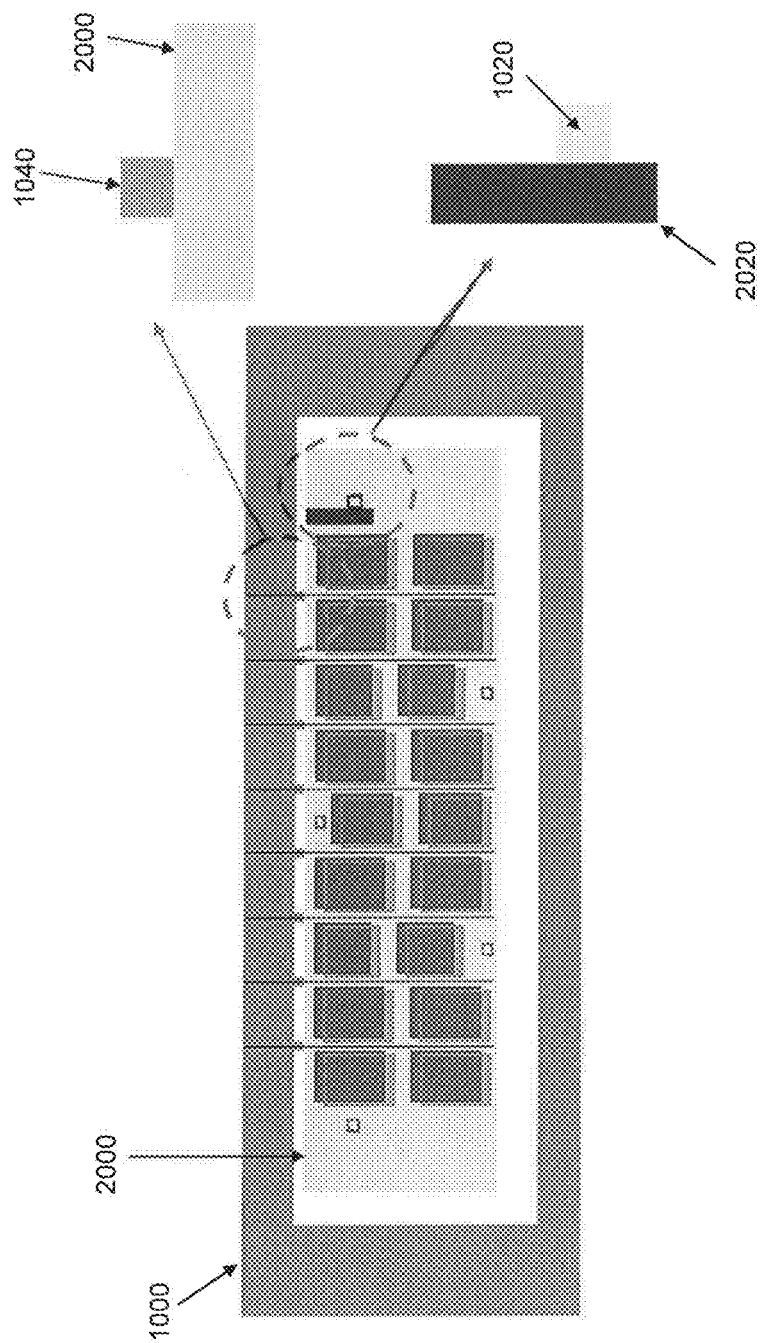
FIG. 10 illustrates a self-alignment of the laser chip and Si-photonic chip.

FIG. 10 illustrates a self-alignment of the laser chip 2000 and the Si-photonics chip 1000. As can be seen in FIG. 10, since eight waveguides 1040 on the Si-photonics chip 1000 are located in the center region of the laser chip 2000 due to circuit design preference, if the laser chip 2000 is tilted during self-alignment, all eight waveguides 1040 are not properly aligned. Furthermore, there may be friction between the sidewall of the mechanical stop 2020 and the standoff and mechanical stop structure 1020.

Figure 11:
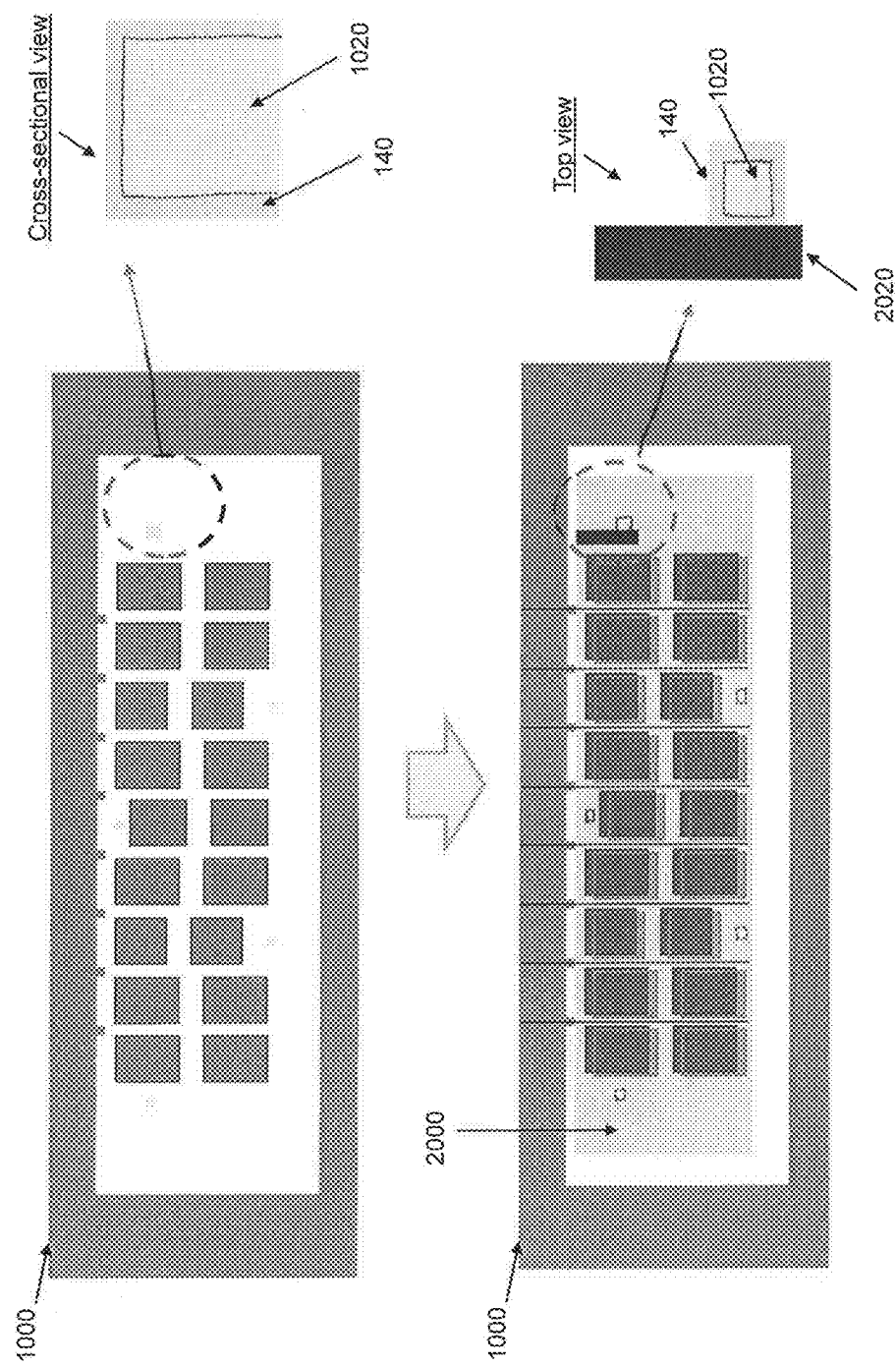
FIG. 11 illustrates a structure of a laser chip and Si-photonic chip according to an exemplary embodiment of the present invention.

Referring now to FIG. 11, in a method for assembling a semiconductor device according to an exemplary embodiment of the present invention, a low temperature solder 140 is deposited at a sidewall of the standoff and mechanical stop structure 1020 as well as the top of the standoff and mechanical stop structure 1020, as described previously. The low temperature solder 140 may be the same as that described above with reference to FIGS. 1-9. The use of the low temperature solder 140 around the standoff and mechanical stop structure 1020 can further minimize friction during self-alignment. It should also be understood that the low temperature solder 140 could be deposited on the mechanical stop 2020.

In accordance with an exemplary embodiment of the present invention, there is provided a flip-chip assembly process in which two mechanical dummy waveguides are added to the edge of the Si photonics chip and the low melting temperature solder is deposited thereon.

Figure 12:
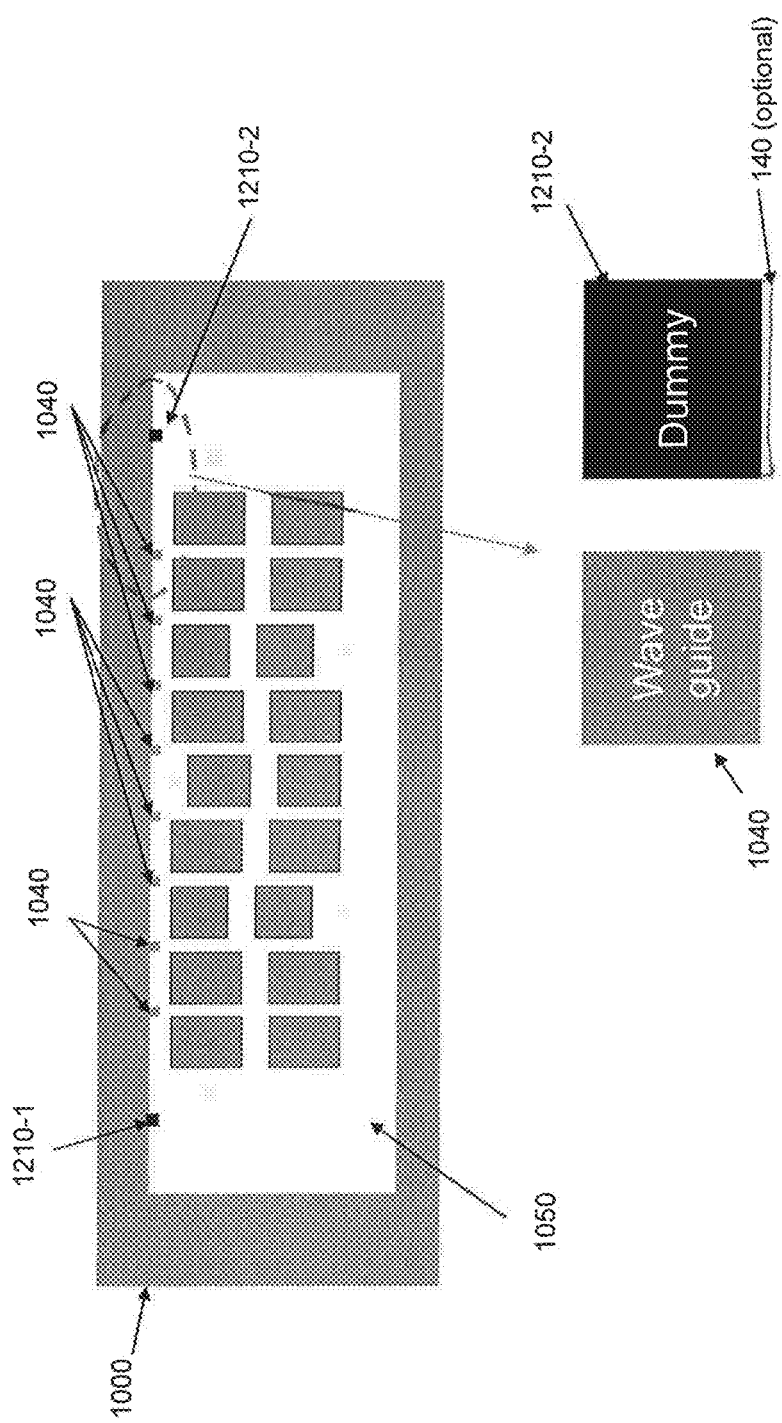
FIG. 12 illustrates a structure of an Si-photonic chip according to an exemplary embodiment of the present invention.
Figure 13:
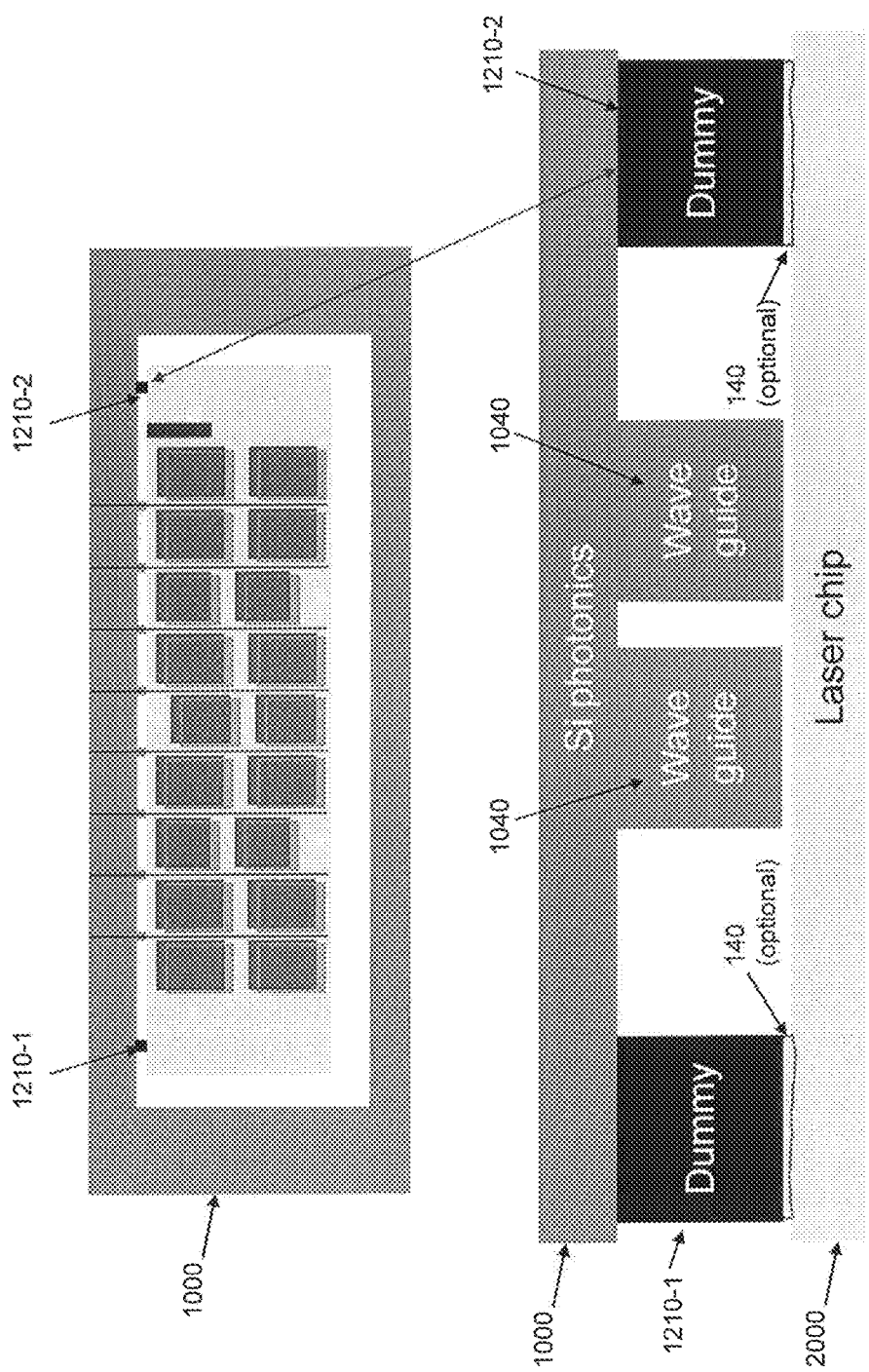
FIG. 13 illustrates a self-alignment of the Si-photonic chip of FIG. 12 and a laser chip according to an exemplary embodiment of the present invention.

FIG. 12 illustrates a structure of an Si-photonic chip according to an exemplary embodiment of the present invention. As shown in FIG. 12, two dummy waveguides 1210-1 and 1210-2 are arranged near an edge of the cavity 1050. More specifically, the dummy waveguides 1210-1 and 1210-2 are disposed at opposite ends of a row of waveguides 1040. As further shown in FIG. 12, optionally, the low temperature solder 140 is deposited on a side of each of the dummy waveguides 1210-1 and 1210-2. FIG. 13 shows that the dummy waveguides 1210-1 and 1210-2 with the low temperature solder 140 near the edge prevents tilting of the laser chip 2000 during self-alignment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for assembling a semiconductor device, comprising:

receiving a first chip including a plurality of first bonding pads, a first standoff and a second standoff, wherein a first solder is deposited on each of the first bonding pads;

depositing a second solder on each of the first and second standoffs;

arranging a second chip over the first chip, wherein the second chip includes a plurality of second bonding pads, and at least one of the second bonding pads has a corresponding first bonding pad;

heating the second chip over a melting point of the second solder to melt the second solder, and placing the second chip on the first chip to touch and solidify the second solder on each of the first and second standoffs;

performing a reflow process to melt the first solder on each of the first bonding pads so that at least one of the first solders touches a corresponding second bonding pad; and waiting a predetermined period of time to allow the second chip to move until a side edge of the second chip touches a waveguide of the first chip, wherein the second solder is disposed on a surface of each of the first and second standoffs that contacts the second chip before the at least one first solder is melted to touch its corresponding second bonding pad.

2. The method of claim 1, wherein the first chip is a photonic chip with one or more waveguides.

3. The method of claim 2, wherein the one or more waveguides in the first chip are arranged in a row, the method further comprising arranging at least one dummy waveguide near an end of the row.

4. The method of claim 3, further comprising depositing the second solder on a sidewall of the dummy waveguide.

5. The method of claim 1, wherein the second chip is a laser chip with one or more light sources.

6. The method of claim 1, wherein the melting point of the second solder is lower than that of the first solder.

7. The method of claim 1, wherein the second solder includes indium and the first solder includes tin.

8. The method of claim 1, wherein a thickness of the second solder deposited on each of the first and second standoffs is about 0.01 micron to about 1 micron.

9. The method of claim 1, wherein the second chip includes a lateral stop and a third standoff of the first chip is disposed adjacent to the lateral stop.

10. The method of claim 9, further comprising depositing the second solder on a sidewall of the third standoff.

11. The method of claim 1, wherein the first and second chips have a flip-chip structure in which the first chip has one or more waveguides and the second chip has one or more light sources.

12. A method for assembling a semiconductor device, comprising:

receiving a first chip including a plurality of standoffs, a plurality of waveguides and a plurality of first bonding pads, wherein a first solder is deposited on at least one of the first bonding pads, and a second solder is deposited on at least one of the standoffs;

heating a second chip over a first temperature, wherein the first temperature is high enough to melt the second solder, and placing the second chip on the standoffs to touch the melted second solder; and performing a reflow soldering process to cause the first solder to touch a corresponding second bonding pad of the second chip and a side of the second chip to touch at least one of the waveguides, wherein the first chip is heated to a second temperature high enough to melt the first solder during the reflow soldering process, wherein the second solder is disposed on a contact surface of the at least one of the standoffs before the first solder is melted.

13. The method of claim 12, the first temperature is lower than the second temperature.

14. The method of claim 12, wherein the first solder includes tin and the second solder includes indium.

15. The method of claim 12, wherein the first chip is a photonic chip and the second chip is a laser chip.

16. A semiconductor device, comprising:

a first chip comprising a plurality of first bonding pads, a plurality of standoffs, and a plurality of waveguides, wherein a first solder is disposed on each of the first bonding pads, a second solder is disposed on at least one of the standoffs, and a melting point of the second solder is lower than a melting point of the first solder; and a second chip comprising a plurality of second bonding pads arranged on a first side of the second chip, wherein the first side of the second chip is disposed directly on the second solder, at least one of the second bonding pads is connected to a corresponding first bonding pad via the first solder, and a second side of the second chip contacts at least one of the waveguides, wherein the second solder is disposed on a surface of the at least one standoff that contacts the second chip before the first solder disposed on each of the first bonding pads is melted.

17. The semiconductor device of claim 16, wherein the second side of the second chip is substantially perpendicular to the first side of the second chip.

18. The semiconductor device of claim 16, wherein the first and second chips have a flip-chip structure.

19. The semiconductor device of claim 16, wherein the first chip is a photonic chip and the second chip is a laser chip.

* * * * *